Aug. 3, 1954

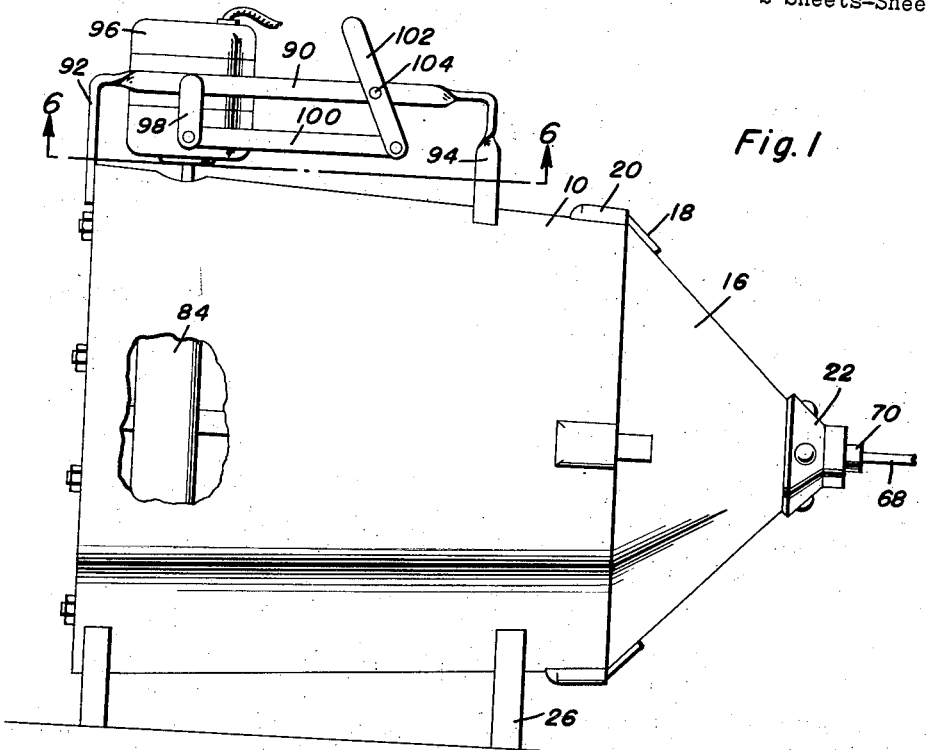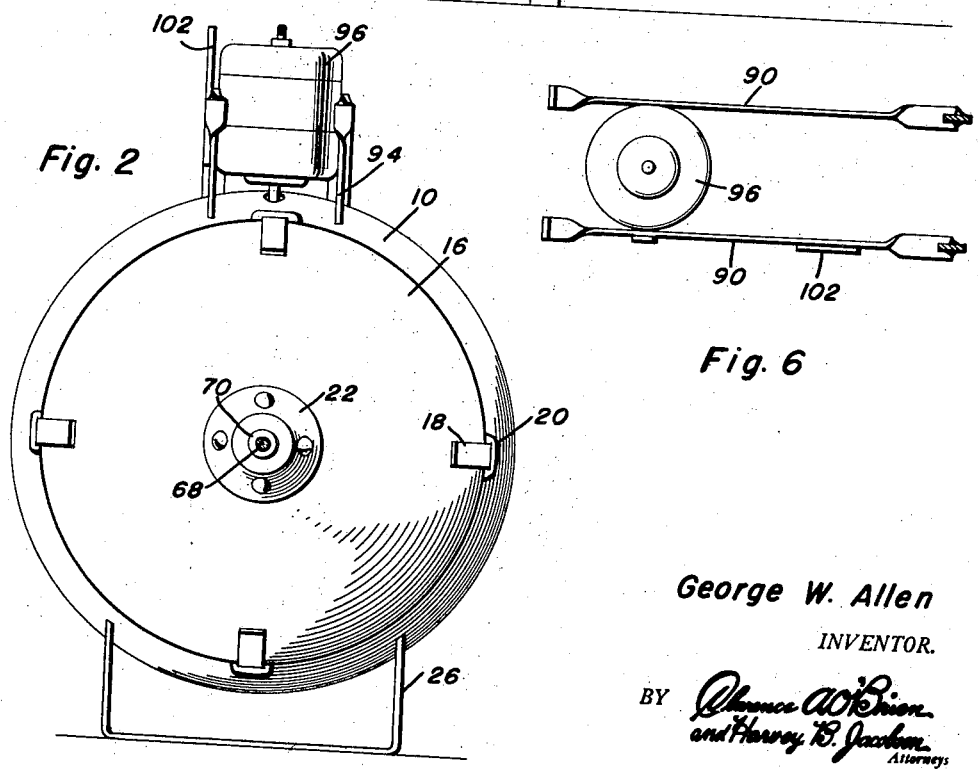

G. W. ALLEN 2,685,097

CABLE WINDING APPARATUS

Filed May 28, 1951

George W. Allen
INVENTOR.

BY Clarence A. O'Brien
and Harvey B. Jacobson
Attorneys

Patented Aug. 3, 1954

2,685,097

UNITED STATES PATENT OFFICE 2,685,097

CABLE WINDING APPARATUS

George W. Allen, Omaha, Nebr.

Application May 28, 1951, Serial No. 228,652

1 Claim. (Cl. 15—104.3)

This invention comprises novel and useful improvements in a cable winding apparatus and more specifically pertains to an electrically operated cable mechanism for cleaning sewers and drain pipes.

The primary object of this invention is to provide an improved apparatus for reeling or unreeling a flexible cable of the type employed for cleaning sewers and drain pipes.

A further object of the invention is to provide a cable winding device in accordance with the preceding object having an improved cable storing drum construction for receiving and storing the cable in an improved manner.

A further object of the invention is to provide a winding device in conformity with the above mentioned objects having novel and improved means for reversibly rotating the cable drum.

Yet another object of the invention is to provide a cable winding apparatus as set forth in the foregoing objects which shall have an improved construction for guiding the cable during its winding upon or dispensing from the storage drum.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a side elevational view, parts broken away, of a suitable apparatus in conformity with the principles of this invention;

Figure 2 is an end elevational view of the apparatus in Figure 1, the same being taken from the right end thereof;

Figure 3:
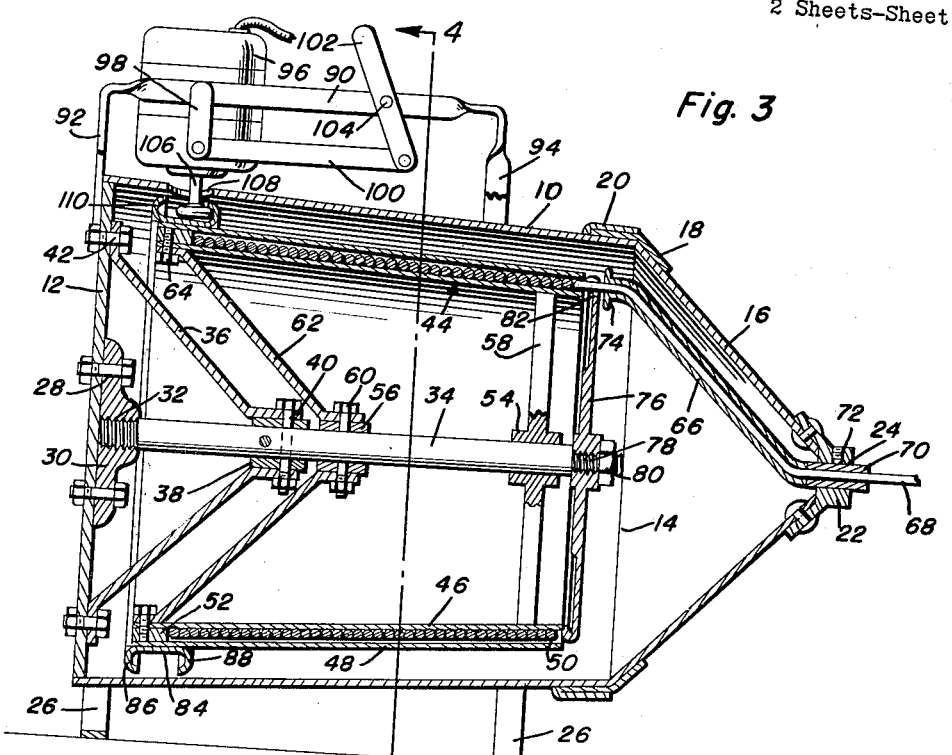
Figure 3 is a vertical central longitudinal sectional view through the apparatus, taken substantially upon the plane indicated by the section line 3—3 of Figure 4.
Figure 4:
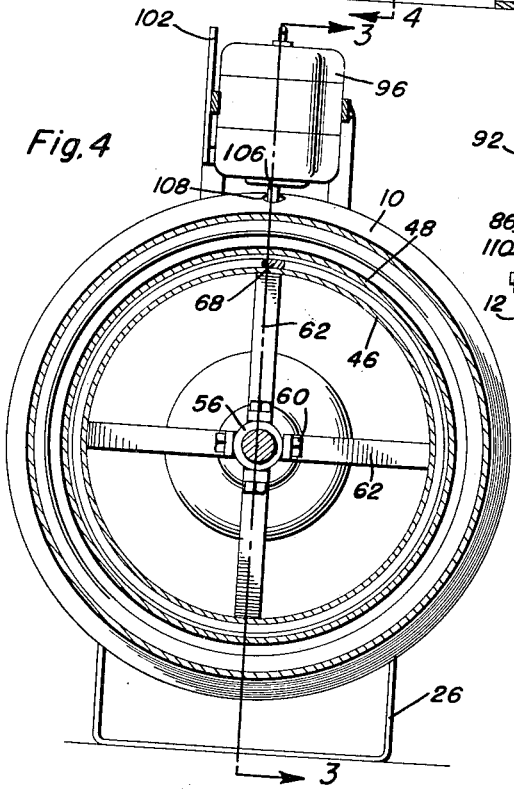
Figure 4 is a vertical transverse sectional view taken substantially upon the plane indicated by the section line 4—4 of Figure 3.

Referring now more specifically to the accompanying drawings, wherein like numerals designate similar parts throughout the various views, attention is directed chiefly to Figure 3 wherein it will be seen that the device preferably comprises a cylindrical or frusto-conical housing, the latter form being illustrated at 10 and including a circular rear wall 12 and an open front end 14. As shown, the diameter of the open end 14 is less than the diameter of the rear wall 12. A conical closure 16 is provided for the open front end, the same including fastening brackets 18 releasably and slidably received in retaining seats formed by brackets 20 welded or otherwise suitably secured to the surface of the housing 10. The conical cover 16 is provided with an axially disposed nose portion 22 having an axial bore 24 therethrough for a purpose to be subsequently set forth. The casing 10 may be provided with suitable supporting legs 26 although other supporting means such as rollers or the like could be provided as desired.

Disposed axially of the rear wall 12 and secured thereto as by fastening bolts 28 is a mounting plate 30 which is internally screw threaded as at 32 for the reception of the screw threaded extremity of an axle 34. The latter is disposed axially of the housing 10 and is stationary therein, being further supported by forwardly extending braces 36 having a bushing 38 for receiving the axle 34, suitable fastening bolts 40 being provided for securing the members 36 to the bushings and the latter to the axle as shown.

At their other extremities, the members 36 are bolted as at 42 to the rear wall 12. The axle 34 is thus supported in cantilever fashion from the rear wall by virtue of the mounting plate 30 and the bushing 38.

Rotatably journaled upon the stationary axle 34 is a hollow drum indicated generally by the numeral 44. This drum is preferably also of a cylindrical or frusto-conical shape in conformity with the shape of the casing 10, and is of such dimensions as to substantially fill the hollow interior of the housing. The drum 44 preferably comprises concentric inner and outer sleeves 46 and 48 respectively which thus define an annular cable storing and receiving chamber therebetween. This chamber is open at its front end 50, this front end being disposed closely adjacent the open front end 14 of the housing 10. The rear end, however, is closed by an annular band or ring 52 which is disposed between the inner and outer sleeves 46 and 48 and which is fixedly secured to and supports the same by any desired type of fastening connection.

The drum 44 is rotatably mounted upon the axle 34 by means of front and rear bearings 54 and 56 respectively, the front bearings having radially disposed spokes 58 which the bearing is attached to the inner sleeve 46 adjacent the open front end of the same, while the rear bearing 56 has bolted thereby as by fastening bolts 60, the radially disposed and rearwardly extending spokes 62 the outer ends of which are secured as by bolts 64 to the ring 52.

It will be noted that the drum is thus supported upon the cantilever portion of the stationary axle 34, but partially encloses and envelopes the forward bearing supports 38 of the axle. This provides, as shown in Figure 3, a very compact arrangement while permitting the utilization of substantially the entire length of the casing 10 to thereby permit the employment of a drum of the maximum size.

A tubular guide 66 is provided for slidably and rotatably receiving a flexible cable 68 of a type customarily employed for cleaning and unstopping sewer and drain pipes.

This rotary guide includes a cylindrical portion 70 which is rotatably journaled in the nose piece 22 of the conical closure 16, and a set screw 72 may be provided for locking the guide in rotatably adjusted position. The other end of the guide, as at 74, is disposed closely adjacent the open end of the annular cable storing chamber of the drum. An annular retainer plate 76 is disposed upon the screw threaded extremity 78 of the axle 34, being retained thereon as by a fastening nut 80. It is contemplated that the retainer plate 76 shall be fixedly and stationarily secured to the stationary axle 34, but removable therefrom as desired. The periphery of the plate 76 closely overlies the open end of the annular chamber 50 to form a closure for the same, and between the extremity 74 of the guide 66 and the open end of the storage chamber, the plate 76 is provided with a notch 82 through which the flexible cable 68 is threaded.

It will now be apparent that if the width between the walls 46 and 48 of the annular cable storage chamber 50 is made substantially equal to or slightly greater than the diameter of the flexible cable 68, the latter will be smoothly and evenly wound upon the inner wall 46. Upon rotation of the drum, by a means to be subsequently set forth, the cable will be moved through the slot 82 in the retainer plate 76, through the guide 66 and outwardly of the casing, either inwardly or outwardly depending upon the direction of rotation of the drum. Thus, the cable when wound in will be completely enclosed in the annular storage chamber within the drum; will be guided throughout substantially its entire range of movement; and the guide and drum will be housed in a dust-proof casing.

In order to provide a reversible driving means for the drum and for rotating the latter by power, the following mechanism is provided. Secured to any convenient portion of the drum, as for example upon the base portion of the circumference thereof, is an annular track in the form of a channel member 84. This channel member has a pair of concave walls 86 and 88 which face each other. A pair of bracket supports are secured to the exterior surface of the casing 10, these supports consisting of parallel mid-portions 90, having downturned supporting legs 92 upon one end which are secured in any desired manner to the end wall 12 of the casing, and having downturned supporting legs 94 at the other ends which are suitably secured to the exterior surface of the housing 10. An electric motor 96 is pivotally mounted between the mid-portions 90 for pivoting movement in a direction longitudinal of the housing 10 and transversely of the channel member 84. A crank arm 98 is secured to the axle or trunnions pivotally supporting the motor 96, and a connecting link 100 is pivoted to the crank arm at the lower end of a manually operated lever 102 which is pivoted as at 104 to one of the mid-portions 90.

Figure 5:
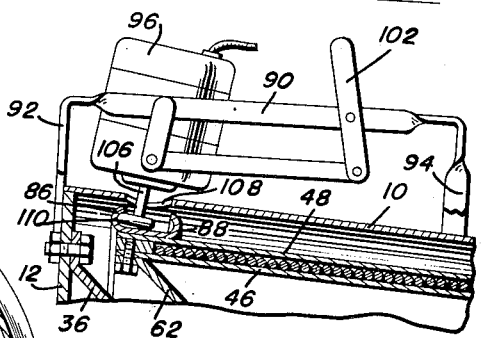
Figure 5 is a fragmentary sectional view of a portion of Figure 3 but showing the manner in which the cable drum is rotated in a reverse direction; and, Figure 6 is a horizontal sectional view taken substantially upon the plane indicated by the section line 6—6 of Figure 1 of the reverse mechanism of the invention.

Obviously, by rocking the lever 102 as shown in Figures 3 and 5, the motor can be tilted to either of the two positions shown in Figures 3 and 5.

The motor shaft 106 extends through a slot 108 of the housing 10 and is provided with a friction roller 110 which is loosely receivable within the track or channel 84.

The arrangement is such that the motor may be selectively moved into either of the positions in Figures 3 and 5 whereby the friction roller will engage one or the other of the channel walls 86 and 88. Thus, the motor, by drivingly engaging either of the two oppositely disposed walls, is capable of frictionally driving the drum in reverse directions of rotation.

It will thus be apparent that the operator can readily and easily reverse the direction of rotation of the drum so as to selectively force out or reel in the flexible cable 68 and readily manipulate the same in a sewer or drain pipe for unclogging, cleaning or opening the same.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

Having described the invention, what is claimed as new is:

A cable winding apparatus comprising support means, an axle mounted on said support means, a drum rotatably mounted on said axle, said support means including a casing enclosing said axle and said drum and having an axial opening therein spaced from one end of said axle and axially aligned with said axle, a guide for a rotary cable mounted on said support means and having a portion thereof disposed in said opening for guiding a cable between said drum and opening during rotation of the drum, a driving track on said drum, a motor mounted on said support means and having a friction roller operatively engaged with said driving track, said drum including concentric walls being spaced equidistant from one another throughout their width to define an annular cable storing chamber therebetween, said driving track comprising an annulus, lever means for moving said motor to selectively engage the roller with opposite walls of said driving track for reversing rotation of said drum, and a pair of U-shaped brackets mounted on said support means, said motor being pivotally mounted on and between said brackets, said lever means being operatively mounted on said brackets.

References Cited in the file of this patent

UNITED STATES PATENTS

| Number | Name | Date |
|---|---|---|
| Re. 22,113 | Blanc | June 16, 1942 |
| 1,677,167 | Borgeson | July 17, 1928 |
| 2,468,490 | Joseph | Apr. 26, 1949 |
| 2,504,391 | Carson | Apr. 18, 1950 |